G. W. DREXELIUS.
COUNTING AND WEIGHING MACHINE.
APPLICATION FILED JUNE 17, 1914.
1,134,112.
Patented Apr. 6, 1915.
2 SHEETS—SHEET 1.
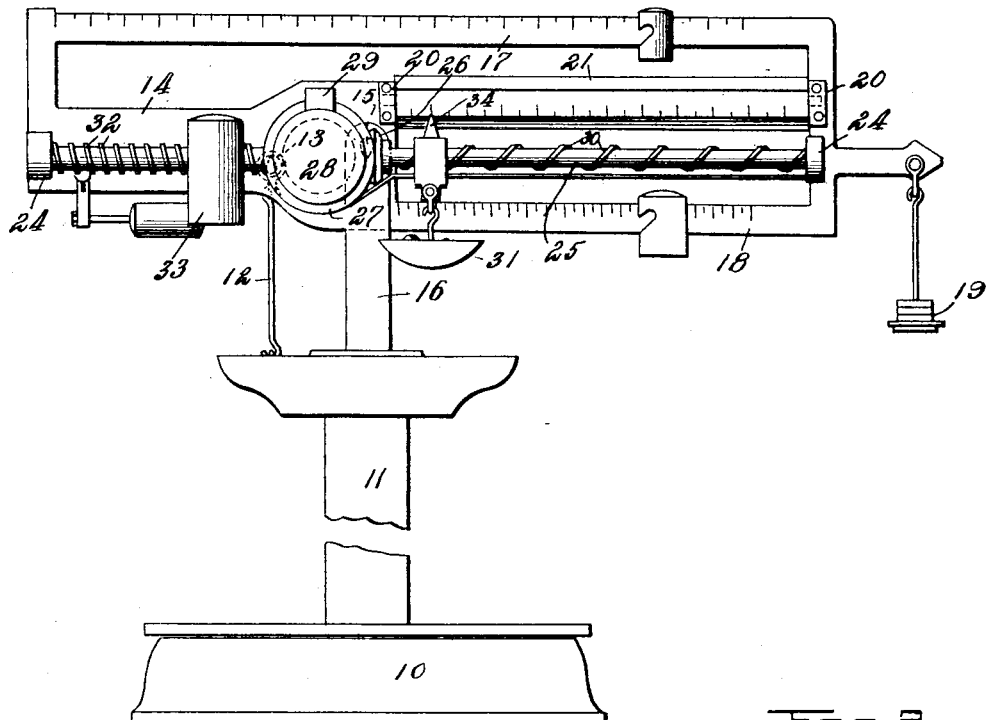
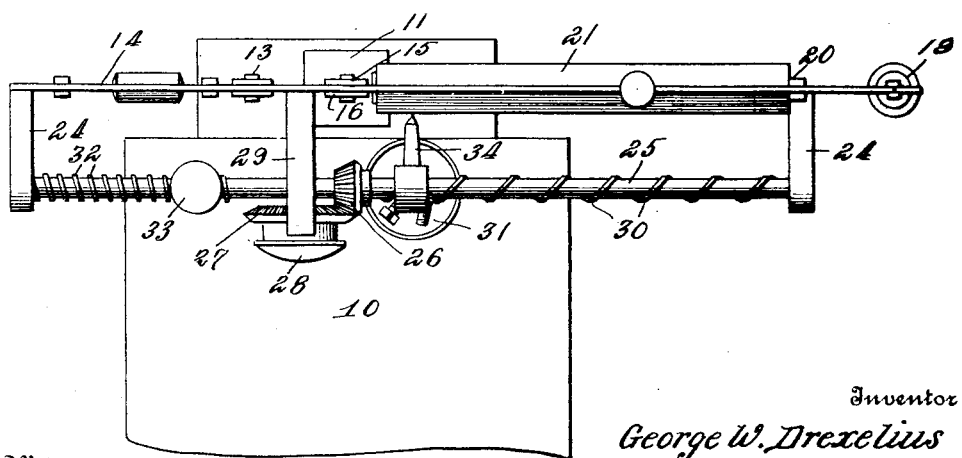
Witnesses
Inventor
George W. Drexelius

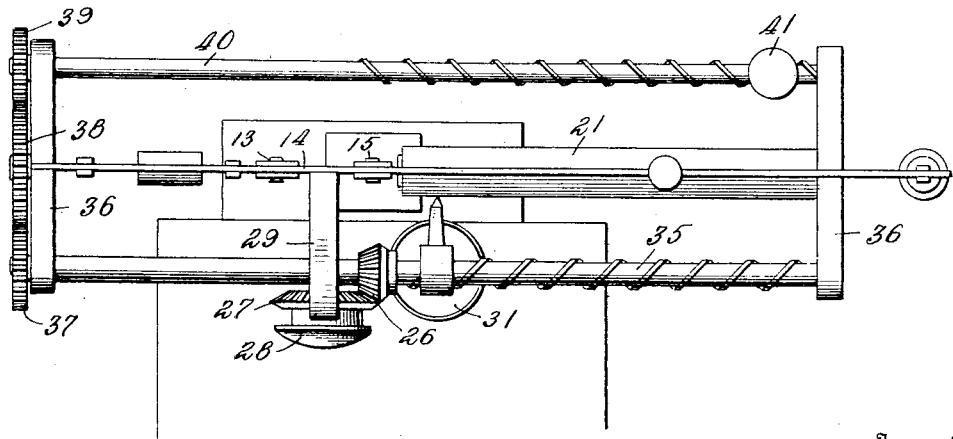

UNITED STATES PATENT OFFICE.

GEORGE W. DREXELIUS, OF BALTIMORE, MARYLAND, ASSIGNOR OF ONE-HALF TO WALTER R. METZ, OF WASHINGTON, DISTRICT OF COLUMBIA.

COUNTING AND WEIGHING MACHINE.

1,134,112.     Specification of Letters Patent.     Patented Apr. 6, 1915.

Application filed June 17, 1914. Serial No. 845,601.

*To all whom it may concern:*

Be it known that I, GEORGE W. DREXELIUS, a citizen of the United States, residing at Baltimore, in the State of Maryland, have invented new and useful Improvements in Counting and Weighing Machines, of which the following is a specification.

The present invention relates to improvements in counting and weighing machines, and has for its object to improve and simplify the scale mechanism characteristic of such machines. Machines of this character are not broadly new, as it has been heretofore contemplated to provide a weighing and counting machine in which an article, or a predetermined number of articles, may be utilized as the balancing weight of the scale, so that when such balancing weight is shifted to a certain position on the scale beam and the bulk to be counted is placed upon the platform of the scale, the beam will tilt under the weight of the bulk when the desired number of articles have been placed upon the platform, and the necessity of counting such articles is done away with, as their number is determined by weight.

Heretofore devices for manipulating the balancing weights and preserving the equilibrium of the scale beam have been devised, and it is with this adjusting and balancing mechanism that my present invention has to do, my purpose being to simplify and render more efficient the present mechanisms so far as they are now known to me.

In order that the invention may be clear to those skilled in the art, I have illustrated in the accompanying drawings one embodiment of my invention, and have shown it as applied to platform scales, although it will be understood that this illustration is simply illustrative and in no sense restrictive of my invention, as it may be applied to any and all types of scales without departing from the principles thereof.

Figure 1 is a view in side elevation of a scale embodying my invention. Fig. 2 is a plan view of the mechanism shown in Fig. 1. Fig. 3 is an end view of the scale beam and associated parts. Figs. 4, 5 and 6 are details of the counting beam and its appurtenances. Fig. 7 is a plan view of the beam mechanism to show a slightly different means for balancing the beam. Fig. 8 is a view of a shifting screw for the traversing pan provided with a plurality of screw threads.

Referring to the drawings by numbers, like numbers indicating similar parts in the several views, 10 indicates conventionally the platform of a weighing scale from which the usual standard 11 rises, the ordinary lever and link connections for transmitting from the platform to the scale beam being provided, the beam rod 12 connecting with the knife-edge loop 13 on the scale beam 14, which scale beam carries the knife-edge 15 upon which it is poised on the beam support 16 in the usual and well known manner.

The scale beam, which may be of any preferred type has the usual scaled arms 17 and 18 with appropriate weights for ordinary weighing purposes, the counterpoise 19 being provided as is usual. In addition, the said scale beam is provided with bearings 20 in which is journaled the counting beam 21, said counting beam being preferably polygonal in cross section, as shown in Fig. 6, in order that provision may be made for different scales appropriate to the articles to be counted, and in order that the said counting beam 21 may be maintained in any position of adjustment to which it may be brought, I provide a locking detent which, in the present instance, comprises a spring ball 22 bearing against the end of the beam 21 and adapted to seat in any one of a series of receiving sockets 23 in the end of the beam, so that, while the beam will be maintained, under normal conditions, in any position of adjustment to which it may be brought, it may be easily turned for purposes of adjustment. It will be observed that the beam 21 is so mounted between the regular scale beams as not to interfere with their use in the slightest degree, and furthermore, that it is readily readable and manipulable by reason of its location. The said beam 21 will be appropriately scaled and will carry a legend, as shown in Fig. 4, to indicate the number of pieces to be placed in the weight pan, presently to be described, when a particular scale on the counting beam is used.

Supported by brackets 24 extending from the scale beam, as best shown in Figs. 1, 2 and 3, is a rotatable shaft 25, provided intermediate its ends with a gear 26, which meshes with a gear 27 having a turning disk 28, and mounted in a suitable support 29 extending from the scale beam 14.

By means of the gear 27, which may be readily rotated through the hand disk 28, the gear 27 and its shaft 25 will be driven in either direction dependent on the direction of rotation of the gears. The shaft has at one portion a quick screw 30 adapted to traverse the pan 31, suspended from a suitable traversing block mounted on the shaft 25. The other portion of the shaft 25 is provided with a slow screw 32 to cause the traverse of a compensating or balancing weight 33, which will take care of the shifting weight of the pan 31, the screws 30 and 32 being so proportioned as that the traverse of the pan 31 and of the weight 33 will be in proper ratio so as to maintain the necessary balancing of the scale beam.

The operation of the construction above described is as follows:—The counting beam 21 being rotated to bring in place the particular scale to be used for the articles to be counted, the number of articles specified in the legand on the counting beam are placed in the pan 31. If two hundred articles similar to those placed in the pan are to be counted out, the hand gear 27 is rotated and the screw shaft 25 driven until the nut supporting the pan 31 is shifted to the point where the index 34 carried by the nut registers with the numeral 200 on the counting scale, the weight 33, it being understood, shifting proportionately along the screw 32 as the pan 31 shifts outwardly on the screw 30. The articles to be counted will then be loaded upon the scale platform until the weight of such articles tilts the beam and the result will be the number of articles indicated by the pointer or index finger 34. If weight, as well as counting, is required, this, of course, can be accomplished in the usual manner by use of the scale beams 17 and 18 and their customary shifting weights.

In Fig. 7 I have shown a slightly different method of manipulating the pan and its counter-balancing weight, for in this construction instead of mounting the pan and counter-balancing weight upon the same shaft, I mount the pan upon a threaded shaft 35 journaled in suitable brackets 36 at each end of the scale, the said shaft 35 being provided with a gear 37 which, by an idler gear 38, transmits motion to the gear 39 mounted on an oppositely placed shaft 40 correspondingly threaded and journaled in the brackets 36. This shaft 40 carries the counter-balancing weight 41, and, since it is reversely threaded, the weight 41 will shift in a direction opposite to the shifting of the pan 31, so as to maintain the beam in balance. In use, the parts are manipulated in the same manner as in the construction shown in the other figures and hereinbefore described.

In Fig. 8 I have shown a shaft for driving the scale pan 31 provided with a plurality of threads, a double screw being shown in the present instance, although it will be understood that more threads may be used if desired. With the plural threaded screw or shaft shown in Fig. 8, the danger of accidental shifting the scale pan after it has been once set is done away with, the increased friction between the parts serving to more certainly maintain the traversing nut with its suspended pan in position.

From the foregoing it will be seen that I have provided a construction which is very compact and simple in operation, but which will not become easily disarranged or out of adjustment, the movements of the parts being positive and the connections and mountings being rigid, so that inaccuracy due to slipping or disarrangement of the parts is impossible. Furthermore, in either of the arrangements shown the constructions are such that the parts all lie within a very narrow area, the operating mechanism permitting a close assemblage of the parts adjacent to each other and the scale beam.

It is to be understood that changes in mechanical construction may be made without departing from the spirit of my invention, and all such changes as are merely mechanical expedients without departing from the principle involved, I deem to be within the purview of my invention.

What I claim is:—

1. In a scale, the combination with a weighing beam having the usual upper and lower scale beams, of a counting beam mounted on said weighing beam between said scale beams, brackets extending outwardly from the weighing beam, supporting means on the bracket, a unit pan supported on said means, a counter-balance for the unit pan mounted on the supporting means, an index on said unit pan adapted to travel over said counting beam, and means for moving said unit pan and said counter-balance simultaneously in opposite directions.

2. In a scale the combination with a weighing beam having the usual vertically spaced apart scale beams, a plural counting beam adjustably mounted in said weighing beam between said scale beams, brackets extending laterally from the weighing beam, supporting means on the brackets, a unit pan mounted on said supporting means and having an index adapted to move over said plural counting beam, a counter-balance supported by said means, a manually operated device mounted in front of the weighing beam and having connection with said unit pan and the counter-balance whereby the same may be moved simultaneously in opposite directions.

3. In a scale, the combination with a weighing beam, of a single shaft mounted on and extending longitudinally of said beam and having coarse and fine screw threads respectively at its opposite ends, a unit pan mounted on said coarse screw threads, a counter-balance mounted on said fine screw threads, a hand wheel arranged on the front side of said beam, and intermeshing gears on said shaft and the hand wheel whereby the unit pan and the counter-balance may be moved simultaneously and in opposite directions.

4. In a scale, the combination with a weighing beam, of a shaft journaled on and extending longitudinally of said beam and having coarse and fine opposed screw threads upon the respective ends of the shaft, a unit pan on one end of the shaft, a counter-balance on the other end of the shaft, and a manually operated device engaging the shaft to move the unit pan and the counter-balance simultaneously in opposite directions.

5. In a scale, the combination with a weighing beam, of a shaft journaled thereon, and extending in parallelism therewith, one end of the shaft having coarse screw threads and the other end of the shaft having relatively fine screw threads, a unit pan mounted on said coarse screw threads, a counter-balance mounted on said fine screw threads, and a manually operated device at the forward side of the weighing beam having connection with the shaft to shift the unit pan and the counter-balance simultaneously and in opposite directions.

6. In a scale, and in combination, a pivoted weighing beam, a counting beam journaled therein, a threaded shaft extending on each side of the beam pivot and having reversely-pitched threads, a unit pan having a registering index mounted on said threaded shaft on one side of said beam pivot and adapted to register multiples on said counting beam, a counter-balance for said pan mounted on said shaft on the other side of said weighing beam pivot, and a manually-operated drive for said shaft to shift said unit pan and counter-balance simultaneously and in opposite directions.

In testimony whereof I have hereunto set my hand in presence of two subscribing witnesses.

GEORGE W. DREXELIUS.

Witnesses:
WALTER R. METZ,
CHAS. H. GRAFF.

Copies of this patent may be obtained for five cents each, by addressing the "Commissioner of Patents, Washington, D. C."